US009675966B2

(12) United States Patent
Haddad et al.

(10) Patent No.: US 9,675,966 B2
(45) Date of Patent: Jun. 13, 2017

(54) CATALYST FOR N-BUTANE OXIDATION TO MALEIC ANHYDRIDE

(71) Applicant: INEOS EUROPE AG, Rolle (CH)

(72) Inventors: Muin S. Haddad, Naperville, IL (US); James F. Brazdil, Glen Ellyn, IL (US); Robert A. Gustaferro, Naperville, IL (US)

(73) Assignee: Ineos Europe AG, Rolle (CH)

( * ) Notice: Subject to any disclaimer, the term of this patent is extended or adjusted under 35 U.S.C. 154(b) by 0 days.

(21) Appl. No.: 14/801,085

(22) Filed: Jul. 16, 2015

(65) Prior Publication Data

US 2017/0014812 A1   Jan. 19, 2017

(51) Int. Cl.

| B01J 27/198 | (2006.01) |
| B01J 27/199 | (2006.01) |
| B01J 37/02 | (2006.01) |
| B01J 23/22 | (2006.01) |
| B01J 35/00 | (2006.01) |
| B01J 35/02 | (2006.01) |
| B01J 35/08 | (2006.01) |
| B01J 37/00 | (2006.01) |

(52) U.S. Cl.
CPC ............. *B01J 27/198* (2013.01); *B01J 23/22* (2013.01); *B01J 27/199* (2013.01); *B01J 35/0013* (2013.01); *B01J 35/023* (2013.01); *B01J 35/08* (2013.01); *B01J 37/0045* (2013.01); *B01J 37/0201* (2013.01); *B01J 37/0203* (2013.01); *B01J 37/0207* (2013.01); *B01J 37/0211* (2013.01); *B01J 37/0236* (2013.01)

(58) Field of Classification Search
None
See application file for complete search history.

(56) References Cited

U.S. PATENT DOCUMENTS

| 4,563,439 A | 1/1986 | Bremer et al. |
| 5,235,071 A | 8/1993 | Ueda et al. |
| 5,506,187 A | 4/1996 | Haddad et al. |
| 2004/0014990 A1* | 1/2004 | Storck .................... B01J 27/198 549/259 |
| 2005/0222435 A1 | 10/2005 | Weiguny et al. |
| 2006/0173197 A1 | 8/2006 | Ghelfi et al. |
| 2013/0102455 A1* | 4/2013 | Haddad ................. B01J 27/198 502/8 |

FOREIGN PATENT DOCUMENTS

EP   1663482   6/2006

OTHER PUBLICATIONS

Mastuura I et al, Promotional Effect of Niobium Phosphate for Vanadyl Pyrophosphate Catalyst on Selective Oxidation of Butane to Maleic Anhydride, Catalysis Today, Amsterdam, NL, vol. 28, Jan. 1, 1996, pp. 133-138.
International Searching Authority, International Search Report for PCT/US2016/038696, mailed on Sep. 20, 2016, 14 pages.

* cited by examiner

*Primary Examiner* — Colin W Slifka
(74) *Attorney, Agent, or Firm* — David P. Yusko

(57) ABSTRACT

A promoted VPO catalyst for the oxidation of n-butane to maleic anhydride wherein the catalyst comprises the mixed oxides of vanadium and phosphorus, niobium and at least one of antimony and bismuth, wherein the catalyst may be produced in a process comprising impregnating a VPO catalyst with a metal source compound of niobium and a metal source compound of at least one of antimony and bismuth, to form a metal impregnated VPO catalyst, and then drying the metal impregnated VPO catalyst to form the promoted VPO catalyst.

25 Claims, No Drawings

CATALYST FOR N-BUTANE OXIDATION TO MALEIC ANHYDRIDE

BACKGROUND OF THE INVENTION

Field of the Invention

The present invention relates to an improved catalyst for use in the oxidation of n-butane to maleic anhydride. In particular, the present invention is directed to the method of making metal promoted oxidation catalysts comprising the mixed oxides of vanadium and phosphorus, wherein the catalysts are promoted with niobium and at least one of antimony and bismuth. This preparation method yields improved catalytic compositions for the oxidation of n-butane to maleic anhydride.

Description of the Prior Art

Maleic anhydride is a well-known and versatile intermediate for the manufacture of unsaturated polyester resins, chemical intermediates such as butanediol and tetrahydrofuran, pharmaceuticals and agrochemicals. It is produced by partial oxidation of aromatic (e.g., benzene) or non-aromatic (e.g., n-butane) hydrocarbons. The oxidation is performed in the gas phase, in the presence of a heterogeneous catalyst. The oxidation reaction may be carried out in a fixed, fluidized, or riser bed reactor.

Catalysts containing vanadium and phosphorus oxides have been used in the oxidation of 4-carbon atom hydrocarbons, such as n-butane, n-butenes, 1,3-butadiene or mixtures thereof with molecular oxygen or oxygen-containing gas to produce maleic anhydride. Conventional methods of preparing these catalysts involve reducing a pentavalent vanadium compound, and combining the same with a phosphorus compound, and if desired, promoter element compounds under conditions which will provide vanadium in a valence state below +5 to form catalyst precursors capable of being converted to vanadium phosphorus oxide. The catalyst oxide precursor is then recovered and converted to active catalytic material before or after the suitable catalyst particles for either fixed bed or fluid bed are formed.

The prior art describes many different procedures for this preparation, which in general involve the use of vanadium pentoxide ($V_2O_5$) as a source of vanadium (see e.g. U.S. Pat. No. 5,137,860 and EP 0 804 963 A1). Hydrogen chloride in aqueous solution is one of the reducing agents mentioned for the reduction of $V^{+5}$ to $V^{+4}$. Also used are organic reducing media like primary or secondary aliphatic alcohols or aromatic alcohols such as isobutyl alcohol and benzyl alcohol.

The most used organic reducing agent is isobutyl alcohol since it combines optimal solvent and redox characteristics, thus favoring a complete redox reaction with formation of tetravalent vanadium, which is reacted with phosphoric acid to form vanadyl acid orthophosphate hemihydrate, (VO) $HPO_4 \cdot 0.5H_2O$, which is then subject to further heat treatment to yield a finished catalyst.

U.S. Pat. Nos. 3,888,886; 3,905,914; 3,931,046; 3,932,305 and 3,975,300 disclose the testing of promoted vanadium phosphorus oxide catalysts for maleic anhydride production from butane in one inch diameter fluid bed reactors. In most instances, the catalysts were prepared by forming the vanadyl acid orthophosphate hemihydrate catalyst precursor in aqueous media (in U.S. Pat. No. 3,975,300 the precursor was formed in a paste of a vanadium compound, a phosphorus compound and an organic reducing agent), drying and thereafter grinding and sieving the precursor to a powder of about 74 to 250 microns size.

U.S. Pat. No. 4,647,673 discloses a process for the preparation of attrition resistant, microspheroidal fluid bed catalysts comprising the mixed oxides of vanadium and phosphorus in which a vanadium phosphorus mixed oxide catalyst precursor is densified, comminuted, formed into fluidizable particles and calcined under fluidization-type conditions.

The performance of catalyst comprising the mixed oxides of vanadium and phosphorus may be modified and can be substantially improved by the addition of a promoter element selected from the groups IA, IB, IIA, IIB, IIIA, IIIB, IVA, IVB, VA, VB, VIA, VIB and VIIIA of the periodic table of elements, or of mixtures of such elements. Patent literature claims that the catalytic performance of such catalyst can be substantially improved by addition of these elements. A review of the promoters reported in the literature and of their role has been reported by G. J. Hutchings in Appl. Catal., 1991, 72, 1-32, and in Stud. Surf. Sci. Catal. "Preparation of Catalysts VI", (G. Poncelet et al., Eds.), Vol. 91, Elsevier Science, Amsterdam, 1995, p. 1. Other mention of promoters to improve the performance of catalyst comprising the mixed oxides of vanadium and phosphorus include V. Guliants et al. (Catalyst Letters 62 (1999), 87-9) wherein such catalysts were promoted with Nb, Si, Ti, and Zr; I. Mastuura, et al. (Catal. Today, 1996, 28, 133-138) wherein co-precipitate V and Nb are co-precipitated in an aqueous solution and then the precipitate is treated with benzyl alcohol at reflux; P. G. Pries de Oliveira, et al. (Catal. Today, 2000, 57, 177-186) wherein the VPO precursor is prepared in isobutyl alcohol and $NbPO_4$ is introduced just before the nucleation of vanadyl acid orthophosphate hemihydrate; A. M. Duarte de Farias et al. (J. Catal. 2002, 208, 238-246) solubilize Nb ethoxide into isobutyl alcohol and use it as a reducing agent to prepare the Nb modified catalyst precursor and then the precursor is activated under reaction conditions; U.S. Pat. No. 4,147,661 to Higgins et al. wherein the Nb promoted catalyst is prepared in isobutyl alcohol using hydrogen chloride gas as reducing agent; U.S. Pat. No. 7,638,457 to Ghelfi et. al, wherein small amounts of Nb compounds or salts thereof are added in the preparation of a catalyst precursor mixture, which mixture includes a vanadium source, a phosphorus source, an organic medium capable of acting as a solvent and a reducing agent, and an additive selected from the group consisting of benzyl alcohol and polyols, followed by a thermal treatment of the precursor carried out in the presence of steam.

U.S. Pat. No. 8,658,557 to Haddad et al. teaches a process for the preparation of a promoted VPO catalyst, wherein the catalyst comprises the mixed oxides of vanadium and phosphorus and wherein the catalyst is promoted with at least one of niobium, cobalt, iron, zinc, molybdenum or titanium, said process comprising the steps of (i) preparing a VPO catalyst comprising vanadyl pyrophosphate as the major component and containing less than 5 wt % of vanadyl phosphate, (ii) contacting the VPO catalyst with a solution comprising a metal source compound of at least one metal selected from the group consisting of niobium, cobalt, iron, zinc, molybdenum or titanium to form a metal impregnated VPO catalyst, and (iii) drying the metal impregnated VPO catalyst to form the promoted VPO catalyst. In U.S. Pat. No. 8,658,557, niobium was the preferred promoter.

SUMMARY OF THE INVENTION

The present invention is directed to an improved catalyst for the oxidation of n-butane to maleic anhydride, wherein the catalyst comprises the mixed oxides of vanadium and phosphorus and is promoted with niobium and at least one of antimony and bismuth. These improved catalysts, prepared as described herein, provides greater overall conversion of n-butane to maleic anhydride than promoted catalyst prepared by prior art preparations.

In one embodiment, the invention is a process for the preparation of a promoted VPO catalyst, wherein the catalyst comprises the mixed oxides of vanadium and phosphorus and wherein the catalyst is promoted with niobium and at least one of antimony and bismuth, said process comprising the steps of
  (i) preparing a VPO catalyst comprising vanadyl pyrophosphate as the major component and containing less than 5 wt % of vanadyl phosphate,
  (ii) impregnating the VPO catalyst with a metal source compound of niobium and a metal source compound of at least one of antimony and bismuth, to form a metal impregnated VPO catalyst, and
  (iii) drying the metal impregnated VPO catalyst to form the promoted VPO catalyst.

In one embodiment, the invention is a process for the preparation of a promoted VPO catalyst, wherein the catalyst comprises the mixed oxides of vanadium and phosphorus and wherein the catalyst is promoted with niobium and at least one of antimony and bismuth, said process comprises impregnating a niobium promoted VPO catalyst with a metal source compound of at least one of antimony and bismuth, to form a metal impregnated VPO catalyst, and then drying the metal impregnated VPO catalyst to form the a niobium and at least one of antimony and bismuth promoted VPO catalyst.

In one embodiment, the invention is a process for the preparation of a promoted VPO catalyst, wherein the catalyst comprises the mixed oxides of vanadium and phosphorus and wherein the catalyst is promoted with niobium and at least one of antimony and bismuth, said process comprising contacting a niobium promoted VPO catalyst with a liquid mixture comprising a metal source compound of at least one of antimony and bismuth to form a metal impregnated niobium promoted VPO catalyst, and then drying the metal impregnated VPO catalyst to form the a niobium and at least one of antimony and bismuth promoted VPO catalyst.

In one embodiment, the invention is a process for the preparation of a promoted VPO catalyst, wherein the catalyst comprises the mixed oxides of vanadium and phosphorus and wherein the catalyst is promoted with niobium and at least one of antimony and bismuth, said process comprising the steps of
  (i) preparing a VPO catalyst comprising vanadyl pyrophosphate as the major component and containing less than 5 wt % of vanadyl phosphate,
  (ii) contacting the VPO catalyst with a liquid mixture comprising a metal source compound of niobium and a liquid mixture comprising a metal source compound of at least one of antimony and bismuth, to form a metal impregnated VPO catalyst, and
  (iii) drying the metal impregnated VPO catalyst to form the promoted VPO catalyst.

In one embodiment, of the above preparation, the VPO catalyst is contacted with a single liquid mixture comprising a metal source compound of niobium and a metal source compound of at least one of antimony and bismuth, to form a metal impregnated VPO catalyst In another embodiment, the invention is a process for the preparation of a promoted VPO catalyst, wherein the catalyst comprises the mixed oxides of vanadium and phosphorus and wherein the catalyst is promoted with niobium and at least one of antimony and bismuth, said process comprising the steps of
  (i) preparing a VPO catalyst comprising vanadyl pyrophosphate as the major component and containing less than 5 wt % of vanadyl phosphate,
  (ii) contacting the VPO catalyst with a liquid mixture comprising a source compound of niobium, to form a niobium impregnated VPO catalyst, and
  (iii) drying the niobium impregnated VPO catalyst to form a niobium promoted VPO catalyst.
  (iv) contacting the niobium promoted VPO catalyst with a liquid mixture comprising a metal source compound of at least one of antimony and bismuth, to form a metal impregnated niobium promoted VPO catalyst, and
  (iv) drying the metal impregnated niobium promoted VPO catalyst to form a VPO catalyst promoted with niobium and at least one of antimony and bismuth.

In one embodiment, the invention is a catalytic composition for the oxidation of n-butane to maleic anhydride, comprising the mixed oxides of vanadium and phosphorus and containing less than 5 wt % of vanadyl phosphate, and further comprising niobium and at least one of antimony and bismuth.

As used in this document, "impregnation" (and variations thereof such "impregnate") means to cause to be filled, imbued, permeated, saturated or coated with a material; and "liquid mixture" is a mixture of an organic solvent or water and at least one other compound, and includes within its meaning solutions, slurries and suspensions. In one embodiment, the liquid mixture is an "aqueous mixture" which is a mixture of water and at least one other compound, and includes within its meaning solutions, slurries and suspensions. As used herein, "wt %" means "weight percent" or "percent by weight".

DETAILED DESCRIPTION OF THE INVENTION

The instant invention is a catalyst and the process for the preparation thereof. The catalyst comprises the mixed oxides of vanadium and phosphorus and is promoted with niobium and at least one of antimony and bismuth. The catalyst is useful for the oxidation of n-butane to maleic anhydride.

The Catalyst:

The catalyst of the instant invention comprises oxides of vanadium and phosphorus and is promoted with niobium and at least one of antimony and bismuth. Further, these catalysts contain less than 5 wt % of vanadyl phosphate. In one embodiment VPO catalyst is promoted with niobium and antimony. In another embodiment, the VPO catalyst is promoted with niobium and bismuth.

Catalysts comprising vanadium, phosphorus and oxygen, hereinafter "VPO catalyst", are useful the oxidation of n-butane to maleic anhydride. Such catalyst typically comprise a mixture of the following phases: vanadyl pyrophosphate, $(VO)_2P_2O_7$; vanadyl metaphosphate $VO(PO_3)_2$ and vanadyl phosphate, $VOPO_4$.

Such multi-phase VPO catalysts are typically derived by the thermal treatment of vanadyl acid orthophosphate hemihydrate of the formula $(VO)HPO_4.0.5H_2O$, which may be prepared as described herein.

The improved promoted VPO catalysts of the instant invention, wherein the catalysts are promoted with niobium and at least one of antimony and bismuth may be achieved by a variety of preparation methods.

In one embodiment, the catalyst is produced by contacting a niobium promoted VPO catalyst with a liquid mixture comprising a metal source compound of at least one of antimony and bismuth to form a metal impregnated niobium promoted VPO catalyst, and then drying the metal impregnated VPO catalyst to form the niobium and at least one of antimony and bismuth promoted VPO catalyst. In this embodiment, the niobium is added to the VPO catalyst as part of the preparation of the catalyst slurry prior to drying and calcining the VPO catalyst, or it may be added by impregnation to the dried VPO catalyst as described in U.S. Pat. No. 8,658,557.

In one embodiment, the catalyst is produced in a process comprising the steps of
  (i) preparing a VPO catalyst comprising vanadyl pyrophosphate as the major component and containing less than 5 wt % of vanadyl phosphate,
  (ii) contacting the VPO catalyst with a liquid mixture comprising a metal source compound of niobium and a liquid mixture comprising a metal source compound of at least one of antimony and bismuth, to form a metal impregnated VPO catalyst, and
  (iii) drying the metal impregnated VPO catalyst to form the promoted VPO catalyst.

In one embodiment, of the above process, the VPO catalyst is contacted with a single liquid mixture comprising a metal source compound of niobium and a metal source compound of at least one of antimony and bismuth, to form a metal impregnated VPO catalyst.

In another embodiment, the process for the preparation of a promoted VPO catalyst, wherein the catalyst comprises the mixed oxides of vanadium and phosphorus and wherein the catalyst is promoted with niobium and at least one of antimony and bismuth, said process comprising the steps of
  (i) preparing a VPO catalyst comprising vanadyl pyrophosphate as the major component and containing less than 5 wt % of vanadyl phosphate,
  (ii) contacting the VPO catalyst with a liquid mixture comprising a source compound of niobium, to form a niobium impregnated VPO catalyst, and
  (iii) drying the niobium impregnated VPO catalyst to form a niobium promoted VPO catalyst.
  (iv) contacting the niobium promoted VPO catalyst with a liquid mixture comprising a metal source compound of at least one of antimony and bismuth, to form a metal impregnated niobium promoted VPO catalyst, and
  (iv) drying the metal impregnated niobium promoted VPO catalyst to form a VPO catalyst promoted with niobium and at least one of antimony and bismuth.

Typically, the amount of each metal promoter (niobium, antimony or bismuth) in the resulting catalyst is between 0.1 and 1.0 wt %. In one embodiment, the molar ratio of each metal promoter to vanadium is between 0.0015 to 1 and 0.015 to 1. In another embodiment, the molar ratio of each metal promoter to vanadium is between 0.003 to 1 and 0.01 to 1.

VPO Catalyst Preparation:

A VPO catalyst containing the mixed oxides of vanadium and phosphorus, may be prepared by any method known in the art.

In one method for the preparation of an oxidation catalyst containing the mixed oxides of vanadium and phosphorus, a vanadium compound, particularly a pentavalent vanadium compound, is at least partially solubilized in an organic liquid medium. Suitable vanadium compounds containing pentavalent vanadium include: vanadium pentoxide or vanadium salts, such as ammonium metavanadate and vanadium oxytrihalides. Vanadium pentoxide is preferred. To aid in solubilizing the vanadium, it is preferred that the vanadium-containing compound which is introduced into the liquid medium have a small particle size, and methods for further reducing particle size of the vanadium compound while in the liquid medium, such as by ball milling the initial suspension of vanadium in the liquid medium, may be employed.

The liquid medium employed must be capable of reducing at least a portion of the vanadium to a +4 valence state, either upon addition and solvation, or upon mixing and heating. In addition the liquid medium should be a solvent for phosphoric acid and be relatively unreactive towards phosphoric acid. The liquid medium must not, however, be a solvent for the mixed oxide of vanadium and phosphorus. Suitable liquid media for use in the invention are organic compounds such as alcohols, aldehydes, ketones, ethers and mixtures of the above. The organic liquid media used in the invention is preferably anhydrous. Preferred organic liquids suitable for use as the liquid medium in this invention are alcohols, particularly isobutanol.

After the pentavalent vanadium compound is introduced into the liquid medium, reduction of the vanadium is effected, preferably by heating the resulting reaction medium, with stirring if desired. Preferred vanadium and phosphorus oxide catalysts for the oxidation of 4-carbon atom hydrocarbons to maleic anhydride contain vanadium in an average valence stage of about +3.9 to about +4.6. This average valence state is achieved when at least a portion of the pentavalent vanadium introduced into the reaction mixture is reduced to the +4 state, preferably about +4.1.

After at least partial reduction of the vanadium, a pentavalent phosphorus-containing compound is added to the reaction medium. Suitable phosphorus compounds containing pentavalent phosphorus include: phosphoric acid, phosphorus pentoxide, or phosphorus perhalide, such as phosphorus pentachloride. Phosphoric acid and phosphorus pentoxide are preferred. The pentavalent phosphorus-containing compound is preferably added to the reaction medium in the form of a solution of the phosphorus-containing compound in either a component of the liquid reaction medium, or in a liquid capable of yielding the phosphorus-containing compound to the liquid reaction medium. After addition of the phosphorus-containing compound to the liquid reaction medium, it is preferable to heat the liquid reaction medium with stirring, if necessary.

In the alternative, another method for the preparation of an oxidation catalyst containing the mixed oxides of vanadium and phosphorus, the phosphorus containing compound is added to the liquid medium followed by the addition of vanadium pentoxide to this mixture to form the reaction medium which is then heated with stirring.

As stated above, the liquid medium employed should not be a solvent for the vanadium-phosphorus mixed oxide. Therefore, as the vanadium-phosphorus oxide catalyst precursor is formed, it precipitates out of the liquid reaction medium. The total $H_2O$ content of the medium, particularly at this point, is typically below about 5%.

The catalyst precursor may be recovered from the liquid reaction medium in which it was prepared by conventional methods, such as evaporation, filtration, centrifugation, decanting, and the like. In one embodiment, the precursor is dried by heating. Alternatively, the recovered precursor, which is still partially wet with the organic liquid, may be treated with a low boiling solvent such as petroleum ether. In another embodiment, excess preparational reaction media may be substantially removed by vacuum filtration. In yet another embodiment, excess water can be introduced into the precursor containing organic liquid reaction medium, allowing an organic layer to separate from the aqueous layer followed by recovery of the catalyst precursor by drying.

As stated above, optionally, a source compound for niobium may be added during the preparation of the catalyst precursor before or after the catalyst precursor is recovered from the liquid reaction medium, to ultimately produce a niobium promoted VPO catalyst.

After recovery, the catalyst precursor is subjected to densification and comminution. The order in which the catalyst precursor is densified and comminuted is dependent upon the method used for accomplishing these purposes. For example, the catalyst precursor may be densified by tableting or pelleting the catalyst precursor, and thereafter crushing or grinding the densified material to prepare it for formation of the microspheroidal particles. Alternatively, the catalyst precursor may be recovered by drying or spray drying, and thereafter subjected to dry ball milling in order to both densify the precursor material and comminute the catalyst precursor to an average particle size less than about 1 micron in diameter. The steps of densifying and comminuting the catalyst precursor may be repeated such that the final fluidizable catalyst particle has a bulk density equal to or greater than about 0.75 grams per cubic centimeter, preferably greater than or equal to 1 gram per cubic centimeter.

The densified, comminuted catalyst precursor is then formed into microspheroidal fluidizable particles. Formation may be accomplished by the oil drop method, in which an aqueous solution of the catalyst precursor is dropped into a hot oil bath to cause the formation of spheroidal particles. In another embodiment, the microspheroidal fluidizable particles are formed by spray drying an aqueous slurry of the catalyst precursor.

The formation of fluidizable particles by crushing and screening to form a fluidizable fraction is not suitable for forming attrition resistant catalysts, as the particles easily abrade during fluid bed operation due primarily to their irregular surface texture.

If spray drying is to be utilized, the catalyst precursor preferably should be uncalcined when introduced into water to form the aqueous slurry. Substantial contacting of the calcined vanadium phosphorus mixed oxide catalyst with water (at less than 100° C.) reduces the activity of the catalyst, particularly if calcined in air.

The solids content of the catalyst precursor containing aqueous slurry should be adjusted to about 25 to about 60 weight %. In one embodiment, the solids content is above about 40 weight %. The catalyst precursor-containing aqueous slurry is then spray dried to form uniform, microspheroidal particles having a particle size range of between about 20 to about 300 microns, generally between 20 to about 240 microns. Spray drying may be accomplished by methods known in the art.

The catalyst may comprise 100% active phase with no added inert diluents or supports. In other embodiments, inert diluents or supports may be added to the fluid bed catalyst by the addition of the diluent or support before or during any of the densification, comminution, and formation of the microspheroidal fluidizable particle steps. Such inert diluents or supports may include silica, alumina, alumina silica, titania, niobia, silicon carbide, and the like. In one embodiment the catalyst comprises at least 70% active material. In another embodiment the catalyst comprises at least 80% active material. In yet another embodiment, the catalyst comprises at least 90% active material.

The fluidizable particles prepared above are subjected to calcination under fluidization-type conditions. Fluidization conditions can be determined readily by those of skill in the art, and include the introduction of a gas stream into a catalyst containing fluid bed vessel sufficient to "raise" the catalyst bed and contact substantially all catalyst particles with the gaseous feed, maintaining isothermal temperature control. Other calcination techniques such as cascading calcination, which, similar to fluidization calcination, provide homogeneous gas contacting of the catalyst particles and relatively isothermal temperature control, may be utilized according to the present invention, to result in fluidization-type conditions sufficient to impart attrition resistance to the calcined catalyst. Fluid bed calcination is, however, preferred.

The catalyst is calcined in air or an oxygen containing gas under fluidization-type conditions at a temperature range of about 300° C. to about 450° C. The catalyst may be calcined additionally in the presence of hydrocarbon, an inert gas, or steam. In one embodiment, the calcination temperature is increased from about 300° C. to about 325° C., and then increased steadily to about 400° C. to about 500° C. In one embodiment, the temperature increase is at a rate of about 0.5° C. to 5° C. per minute. Calcination times vary depending upon method of preparation, catalyst composition and amount of catalyst, but generally calcination is conducted for a period of time greater than 1 hour.

The catalyst precursor may contain promoter elements, including but not limited to alkali metals, alkaline earth metals, Ti, Cr, W, Ta, U, Co, Mo, Fe, Zn, Hf, Zr, Mn, As, Sb, Te, Bi, Sn, Ge, Nb, Ni, Cu, Cd, Ce, rare earths or mixtures thereof. These may be incorporated into the catalyst precursor in any of the methods known in the art, such as inclusion via the liquid reaction medium prior to or after reduction of the vanadium, or during one or more steps of the preparation of the fluidizable catalyst. The promoter elements may be added to the catalyst as metals, oxides, hydroxides, carbonates, or salts such as halides, nitrates, acetates, formates, butyrates, benzylates, and the like. In one embodiment, the molar ratio of promoter elements to vanadium is 0.001:1 to 1:1, In another embodiment, the molar ratio of promoter elements to vanadium is 0.003:1 to 0.5:1.

Catalysts suitable for the production of maleic anhydride from 4-carbon atom hydrocarbons generally have a phosphorus to vanadium ratio of about 2:1 to about 0.5:1, preferably about 0.8:1 to about 1.3:1. Most preferred is a P/V ratio of about 1.2:1. These catalysts preferably exhibit an average valence for vanadium within the range of +3.5 to +4.6, preferably about +4.

Vanadyl Pyrophosphate Content A VPO catalyst prepared by prior art processes, including the preparation described above typically contains a mixture of the following phases: vanadyl pyrophosphate, $(VO)_2P_2O_7$; vanadyl metaphosphate $VO(PO_3)_2$ and vanadyl phosphate, $VOPO_4$. A key feature of the process of the instant invention is that the VPO catalyst comprises vanadyl pyrophosphate as the major component and contain less than 5 wt % of vanadyl phosphate ($VOPO_4$).

If the vanadyl phosphate content of the VPO catalyst is greater than the desired range (i.e. greater than or equal to 5 wt % of vanadyl phosphate), it is possible to lessen the amount of vanadyl phosphate in the VPO catalyst by operating the catalyst under butane oxidation conditions to produce maleic anhydride for a period of time sufficient to achieve the desired levels of the vanadyl phosphate phase. In one embodiment, the vanadyl phosphate phase content of a VPO catalyst is reduced to an acceptable level or eliminated completely by operating the VPO catalyst under butane oxidation conditions for about 4 hours to about 80 hours. In another embodiment, the vanadyl phosphate phase may be lessened or removed from the VPO catalyst by "washing" the VPO catalyst with water. In one embodiment, the "washing" procedure comprises combining a solid VPO catalyst with water, removing the water and collecting the solid by filtration, and then drying the filtrate solid to achieve a VPO catalyst containing less or little (if any) of the vanadyl phosphate phase.

Impregnation with Nb, Sb and/or Bi

In one embodiment, the process of the instant invention comprises promoting, via impregnation, the VPO catalyst comprising vanadyl pyrophosphate as the major component and containing less than 5 wt % of vanadyl phosphate, with niobium and at least one of antimony and bismuth. In one embodiment VPO catalyst is promoted with niobium and antimony. In another embodiment, the VPO catalyst is promoted with niobium and bismuth.

In one embodiment the impregnation of a VPO catalyst with niobium and at least one of antimony and bismuth comprises contacting the VPO catalyst with a liquid mixture comprising a source compound of niobium, and a liquid mixture comprising a source compound of at least one of antimony and bismuth, in order to coat or impregnate the surface of the catalyst with the liquid mixture comprising the source compounds. The sequence of impregnation or contacting does not matter. As used herein, a "source compound" is any compound containing at least one of the claimed promoter elements.

Many source compounds for niobium, antimony and bismuth are suitable for use in the instant invention. An example of a source compound for niobium is ammonium niobium oxalate. For avoidance of doubt, ammonium niobium oxalate, generally represented by the formula $NH_4[NbO(C_2O_4)_2(H_2O)_2].2(H_2O)$, may additionally include the following phases, $NH_4(HC_2O_4)(H_2C_2O_4).2(H_2O)$, $NH_4[NbO(C_2O_4)_2(H_2O)_2].3(H_2O)$, and $(NH_4)_3[NbO(C_2O_4)_3].(H_2O)$. Examples of source compounds of antimony are any antimony acetate or antimony oxide, such as $Sb(CH_3COO)_3$, $Sb_2O_5$, and $Sb_2O_3$. In one embodiment the source compound of antimony is nano-particle $Sb_2O_5$ with an average particle size of less than 10 nm. Examples of source compounds of bismuth are bismuth acetates, bismuth oxides, bismuth carboxides, and bismuth hydroxides. In one embodiment, the liquid mixture comprising a source compound of niobium is a 10% by weight ammonium niobium oxalate in water solution. In one embodiment, the liquid mixture comprising a source compound of niobium comprises about 0.5% to about 10% by weight of niobium. In one embodiment, the liquid mixture comprising a source compound of at least one of antimony and bismuth comprises about 0.5% to about 10% by weight of at least one of antimony and bismuth.

In one embodiment, the source compounds for niobium and at least one of antimony and bismuth may be combined or placed into a single liquid mixture to be used to contact the VPO catalyst in order to coat or impregnate the surface of the catalyst with the liquid mixture comprising the source compounds.

In another embodiment, a niobium promoted VPO catalyst is contacted with a liquid mixture comprising a source compound of at least one of antimony and bismuth, in order to coat or impregnate the surface of the catalyst with the liquid mixture comprising the source compounds.

In one embodiment, microspheroidal particles of a catalyst are contacted with the liquid mixture or liquid mixtures comprising the metal source compound. A liquid mixture comprising a metal source compound may comprise an aqueous solvent or a non-aqueous solvent or a mixture thereof. In one embodiment, the liquid mixture comprising the metal source compound is between 5% and 20% by volume source compound and the remainder is water.

The contacting may be done by any incipient wetness impregnation technique or method known in the art, including immersion of the catalyst in the liquid mixture comprising the metal source compound or spraying the liquid mixture comprising the metal source compound onto the catalyst. When the catalyst is contacted with the liquid mixture comprising the metal source compound, the liquid mixture is absorbed into the pores of the catalyst. After contacting the catalyst is "wet" or "damp" with the liquid mixture comprising the metal source compound.

After contacting or impregnation with the liquid mixture comprising the metal source compound, the wet catalyst is dried to remove the organic or aqueous solvent employed in the liquid mixture comprising the metal source compound. The impregnated catalyst is dried in air or an inert atmosphere, (e.g. nitrogen). In one embodiment the impregnated catalyst may be dried in air at room temperature. In one embodiment, the wet catalyst is dried by heating at an elevated temperature for a time sufficient to remove the solvent. In another embodiment, the wet catalyst is dried in air at room temperature to remove a portion of the solvent and then dried in an inert atmosphere at an elevated temperature to complete the drying and decompose any residual organics in the catalyst. Typically, the wet catalyst is dried at between 100° C. and 300° C. for between 2 hrs. and 5 hrs. In one embodiment the wet catalyst is dried at about 200° C. for about 3 hrs.

Oxidation of n-Butane to Maleic Anhydride:

The catalyst used in the present invention may be utilized in any type oxidation reactors known in the art. The catalyst may be formed into tablets, pellets or the like and employed in fixed bed reactors; or the catalyst may be produced in small particle sizes of less than about 100 microns and be used in fluidized bed reactors.

The hydrocarbon reacted to form maleic anhydride may be n-butane, n-butenes, 1,3-butadiene, or a mixture thereof. Preferred is the use of n-butane or a mixture of hydrocarbons that are produced in refinery streams. The molecular oxygen is most conveniently added as air, but synthetic streams containing molecular oxygen are also suitable. In addition to the hydrocarbon and molecular oxygen, other gases may be added to the reactant feed. For example, steam or nitrogen could be added to the reactants.

The ratio of the reactants may vary widely and are not critical. Preferred oxygen/hydrocarbon ratios in the reactor feed are about 4 to about 20 moles of oxygen per mole of hydrocarbon. The reaction temperature may vary widely and is dependent upon the particular hydrocarbon and catalyst employed. Generally, temperatures of about 325° C. to 500° C. are preferred, and temperatures from about 360° C. to about 460° C. are more preferred. The reaction may be conducted at atmospheric, superatmospheric or subatmospheric pressure, although operation at superatmospheric pressure is preferred. Generally, the feed contains about 0.2 to about 5.0 mole percent butane, preferably about 1.0 to about 4.0 mole percent butane, and the butane weight hourly space velocity (wwh) is about 0.005 to about 0.2 lbs butane per lb catalyst per hour, preferably about 0.01 to about 0.1 lbs butane per lb catalyst per hour. As used elsewhere herein, "butane oxidation conditions to produce maleic anhydride" refers to the ranges of parameters set forth in this paragraph.

Additionally, it has been determined that by impregnating the VPO catalyst with an alkyl ester of orthophosphoric acid and adding the impregnated catalyst to a fluid bed VPO catalyst periodically, it is possible to add phosphorous to the VPO fluid bed catalyst and to achieve an increase in maleic anhydride yield at a lower operating temperature.

The preferred alkyl phosphate compound is an alkyl ester of orthophosphoric acid having the formula $(RO)_3P=O$ wherein each R is independently hydrogen or $C_1$ to $C_4$ alkyl, and at least one R is a $C_1$ to $C_4$. The more preferred phosphorus compounds are triethylphosphate or trimethylphosphate.

Generally the alkyl ester of orthophosphoric acid is added to the fluid bed catalyst in an amount of about 1 to about 25 parts by weight of alkyl ester of orthophosphoric acid per 100 parts by weight of the unenriched catalyst, preferably about 7 to about 23 parts by weight of alkyl ester of orthophosphoric acid per 100 parts by weight catalyst; more preferably about 8 to about 21 parts by weight of alkyl ester of orthophosphoric acid per 100 parts by weight catalyst, and more preferably about 16 to about 19 parts by weight of alkyl ester of orthophosphoric acid per 100 parts by weight catalyst.

Specific Embodiments

In order to illustrate the instant invention, catalyst prepared in accordance with the instant invention were evaluated and compared under similar reaction conditions to similar catalysts prepared by prior art methods outside the scope of the instant invention. Many of the examples utilize a fluid bed reactor catalyst containing vanadium, phosphorus, and oxygen with a predominant phase of vanadyl pyrophosphate $((VO)_2P_2O_7)$ and containing less than 5 wt % vanadyl phosphate $(VOPO_4)$ and also containing no promoter elements. Such VPO catalysts employed are commercially available from INEOS USA LLC. Other examples utilize niobium promoted VPO catalyst which was prepared as set forth in Example 16 of U.S. Pat. No. 8,658,557. All reactor testing of the catalysts was done in 1.5" pilot plant reactors containing 370 grams of catalyst, where test conditions were 30/1 air/butane ratio, 0.05 butane weight hourly space velocity (wwh), and 10 psig. Reactor temperature for each example is as listed in Table 1. All examples are provided for illustrative purposes only. Comparative Examples are designated by a "C" before the example number.

Example C1—VPO Catalyst Promoted with Nb

Niobium promoted VPO catalyst was prepared as set forth in Example 16 of U.S. Pat. No. 8,658,557. These niobium promoted VPO catalyst contained less than 1 wt % vanadyl phosphate $(VOPO_4)$ in the VPO catalyst prior to impregnation with niobium. The catalyst was then tested under the n-butane oxidation conditions. The reaction temperature, butane conversion and yield were as listed in Table 1.

Example C2—VPO Catalyst Promoted with Sb (No Nb)

88 gms of an aqueous mixture of antimony acetate, $Sb(CH_3COO)_3$ in water containing nominal 2.67 wt % antimony (III) acetate was added, with stirring, to 400 grams of a niobium-free VPO catalyst containing less than 5 wt % $VOPO_4$. After the addition of the aqueous mixture, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Examples C3—VPO Catalyst Promoted with Sb (No Nb)

This example is similar to Example C2 except that $Sb_2O_5$ from a $Sb_2O_5$ sol (30.89 wt % $Sb_2O_5$) from Campine Company (Belgium) was used as the antimony source. A slurry containing 3.13 wt. % $Sb_2O_5$ was prepared from this sol by dilution with water. 88 grams of this slurry were used to impregnate 400 grams of the niobium free VPO catalyst containing less than 5 wt % $VOPO_4$. The catalyst of this Example C3 is thus promoted with Sb(V) in the +5 oxidation state rather than Sb(III) in the +3 oxidation state as is the case for Example C2. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 4—VPO Catalyst Promoted with Nb and Sb 88 gms of an aqueous mixture of antimony acetate, $Sb(CH_3COO)_3$ in water containing nominal 2.67 wt % antimony(III) acetate was added, with stirring, to 400 grams of the Nb promoted VPO catalyst from Example C1. After the addition of the aqueous mixture, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 5—VPO Catalyst Promoted with Nb and Sb

This example is the same as Example 4 except that 88 gms of a nominal 5.34 wt. % antimony (III) acetate slurry was added to the Nb promoted VPO catalyst from Example C1. After the addition of the slurry, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 6—VPO Catalyst Promoted with Nb and Sb 88 gms of an aqueous slurry composed of 2.67 wt % antimony (III) acetate and 9.06 wt. % ammonium niobium oxalate was added, with stirring, to 400 grams of a niobium-free VPO catalyst containing less than 5 wt % $VOPO_4$. After the addition of the slurry, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 7—VPO Catalyst Promoted with Nb and Sb

This example is similar to Example C3, except ammonium niobium oxalate was added to the $Sb_2O_5$ slurry at a concentration of about 4.3 wt %. 88 grams of this slurry was added, with stirring, to 400 grams of the niobium free VPO catalyst containing less than 5 wt % $VOPO_4$. After the addition of the slurry, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 8—VPO Catalyst Promoted with Nb and Bi 88 gms of a slurry that was prepared by adding 6.9 grams of $Bi(acetate)_3$ to 100 grams of water was added, with stirring, to 400 grams of the Nb promoted VPO catalyst from Example C1. After the addition of the slurry, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 9—VPO Catalyst Promoted with Nb and Sb 88 gms of a slurry prepared by adding 1.32 grams of $Sb_2O_3$ and 11 grams of ammonium niobium oxalate dissolved in 100 grams of water was added, with stirring, to 400 grams of the niobium free VPO catalyst containing less than 5 wt % $VOPO_4$. After the addition of the slurry, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 10—VPO Catalyst Promoted with Nb and Sb (Two Nb Impregnations)

400 grams of niobium-free catalyst containing less than 5 wt % $VOPO_4$ was first impregnated with 88 grams from a stock aqueous mixture prepared by adding 5.34 grams of $Sb(CH_3COO)_3$ and 10.5 gram of ammonium niobium oxalate to 100 grams of water. After air-drying this catalyst in a ventilated hood, the catalyst was re-impregnated with 88 grams from a stock aqueous mixture prepared by adding 10.5 grams of ammonium niobium oxalate to 100 grams of water. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 11—VPO Catalyst Promoted with Nb and Bi 400 grams of niobium-free catalyst containing less than 5 wt % $VOPO_4$ were impregnated with 88 grams from a stock solution prepared by adding 4 grams of bismuth oxide ($Bi_2O_3$) and 10.5 gram so ammonium niobium oxalate to 100 grams of water. The catalyst was then air-dried overnight in a ventilated hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 12—VPO Catalyst Promoted with Nb and Bi 400 grams of niobium-free catalyst containing less than 5 wt % $VOPO_4$ was first impregnated with 88 grams from a stock aqueous mixture prepared by adding 3.8 grams of $Bi(CH_3COO)_3$ and 10.8 grams of ammonium niobium oxalate to 100 grams of water. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 13—VPO Catalyst Promoted with Nb and Sb 400 grams of niobium-free catalyst containing less than 5 wt % $VOPO_4$ were impregnated with 88 grams from aqueous mixture of 0.67 grams of $Sb_2O_3$ and 11 grams of ammonium niobium oxalate dissolved in 100 grams of water. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 14—VPO Catalyst Promoted with Nb and Sb

This Example is the same as Example 13 except 1 gram of $Sb_2O_3$ were used. The catalyst was tested under the n-butane oxidation conditions. The reaction temperature, butane conversion and yield were as listed in Table 1.

Example 15—VPO Catalyst Promoted with Nb and Sb

This Example is the same as Example 13 except 2.76 grams of $Sb_2O_3$ were used. The catalyst was tested under the n-butane oxidation conditions. The reaction temperature, butane conversion and yield were as listed in Table 1.

Example 16—VPO Catalyst Promoted with Nb and Sb

This Example is the same as Example 13 except 6 grams of Nyacol nano-particle $Sb_2O_5$ Sol JL6275 were used. The impregnated catalyst was then air-dried overnight in a ventilated hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 17—VPO Catalyst Promoted with Nb and Sb

This Example is the same as Example 16 except 12 grams of the Nyacol sol were used. The catalyst was tested under the n-butane oxidation conditions. The reaction temperature, butane conversion and yield were as listed in Table 1.

Example 18—VPO Catalyst Promoted with Nb and Sb

This Example is the same as Example 16 except 3 grams of the Nyacol sol and 5.5 grams of the ammonium niobium oxalate were used. The catalyst was tested under the n-butane oxidation conditions. The reaction temperature, butane conversion and yield were as listed in Table 1.

Example C19—VPO Catalyst Promoted with Nb (Added in Catalyst Preparation)

A fresh sample of niobium promoted VPO catalyst (prepared similarly to the VPO catalyst in example C1 but with ammonium niobium oxalate added to the catalyst slurry during the catalyst preparation and prior to drying) was tested in a 1.5" diameter steel fluidized bed reactor to determine maleic anhydride yield. The sample was tested under the n-butane oxidation conditions. Butane conversion and maleic anhydride yield was as listed in Table 1. This is Comparative Example 6 of U.S. Pat. No. 8,658,557 B2.

Example 20—VPO Catalyst Promoted with Nb and Sb 88 gms of an antimony acetate, $Sb(CH_3COO)_3$ in water solution containing nominal 2.67 weight % antimony(III) acetate slurry was added, with stirring, to 400 grams of the niobium containing catalyst prepared according to Example C19. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1. Note that the yield is higher than the yield of the catalyst in Example C10.

Example C21—VPO Catalyst Promoted with Nb and Ti

A solution of 5 grams of titanium bis(ammonium lactate) di-hydroxide (50 wt % solution) in 39 grams of water was added, with stirring, to 400 grams of the niobium containing catalyst of Example C1. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example 22—VPO Catalyst Promoted with Nb, and P and Mo

A solution of 1.5 grams of phosphomolybdic acid and 2.5 grams of ammonium niobium oxalate dissolved in 100 grams of water was added, with stirring, to 400 grams of a niobium-free VPO catalyst containing less than 5 wt % $VOPO_4$. After the addition of the slurry, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C23—VPO Catalyst Promoted with Nb and Fe

A solution of 5 grams of ammonium niobium oxalate and 3.3 grams of ferric ammonium citrate (Fe, 16 wt %) dissolved in 100 grams of water was added, with stirring, to 400 grams of a niobium-free VPO catalyst containing less than 5 wt % $VOPO_4$. After the addition of the slurry, the catalyst was allowed to air dry overnight in an open dish in a laboratory fume hood. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C24—VPO Catalyst Promoted with Nb and Co

A solution of 5 grams of cobalt acetate tetra-hydrate, $Co(II)(CH_3COO)_2.4H_2O$, dissolved in 50 grams of water was added, with stirring, to 400 grams of a niobium-free VPO catalyst containing less than 5 wt % $VOPO_4$. After drying, the cobalt impregnated powder VPO catalyst was contacted with 5 grams of ammonium niobium oxalate dissolved in 50 grams of water. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C25—VPO Catalyst Promoted with Nb and Co

A solution of 0.5 grams of cobalt acetylacetonate dissolved in 100 grams of water was added, with stirring, to 400 grams of the niobium containing catalyst of Example C1. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C26—VPO Catalyst Promoted with Nb and Zn

A solution of 2.5 grams of zinc acetate dihydrate, $Zn(CH_3COO)_2.2H_2O$, dissolved in 88 grams of water was added, with stirring, to 400 grams of the niobium containing catalyst of Example C1. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C27—VPO Catalyst Promoted with Nb and Cu

A solution of 1.3 grams of copper acetate monohydrate, $Cu(CH_3COO)_2.H_2O$ dissolved in 100 grams of water was added, with stirring, to 400 grams of the niobium containing catalyst of Example C1. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C28—VPO Catalyst Promoted with Nb and Cr

A solution of 1.75 grams of chromium acetate di-hydroxide, $Cr_3(CH_3COO)_7(OH)_2$ dissolved in 100 grams of water was added, with stirring, to 400 grams of the niobium containing catalyst of Example C1. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C29—VPO Catalyst Promoted with Nb and Rb

A solution of 1.3 grams of rubidium nitrate dissolved in 50 grams of water was added, with stirring, to 400 grams of the niobium containing catalyst of Example C1. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C30—VPO Catalyst Promoted with Nb and W

A solution of 2.5 grams of ammonium tungstate, $(NH4)6W12O39$, dissolved in 100 grams of water was added, with stirring, to 400 grams of the niobium containing catalyst of Example C1. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

Example C31—VPO Catalyst Promoted with Nb and Eu

A solution of 2.38 grams of europium acetate, $Eu(CH_3COO)_3.xH2O$, dissolved in 100 grams of water was added, with stirring, to 400 grams of the niobium containing catalyst of Example C1. After drying, a portion of the sample was loaded to a 1.5" diameter steel fluidized bed reactor. The catalyst was fluidized with nitrogen and heated up to about 200° C. and then further heated to about 390° C. The catalyst was then tested under the n-butane oxidation conditions. The reaction temperature, butane conversion and yield were as listed in Table 1.

TABLE 1

| Example No. | Description | Reaction Temperature ° C. | C4 Conv. mole % | Maleic Anhydride Yield, mole % |
|---|---|---|---|---|
| C1 | VPO + Nb | 414 | 89.88 | 58.8 |
| C2 | VPO + Sb | 423 | 89.46 | 58.7 |
| C3 | VPO + Sb | 422 | 89.46 | 58.7 |
| 4 | VPO + Nb + Sb | 410 | 89.45 | 61.1 |
| 5 | VPO + Nb + Sb | 416 | 89.8 | 60.7 |
| 6 | VPO + Nb + Sb | 422 | 89.96 | 60.85 |
| 7 | VPO + Nb + Sb | 421 | 88.1 | 59.4 |
| 8 | VPO + Nb + Bi | 411 | 90.67 | 60.25 |
| 9 | VPO + Nb + Sb | 412 | 90.55 | 61.66 |
| 10 | VPO + Nb + Sb | 422 | 89.72 | 60.84 |
| 11 | VPO + Nb + Bi | 413 | 90.70 | 59.38 |
| 12 | VPO + Nb + Bi | 405 | 86.80 | 60.13 |
| 13 | VPO + Nb + Sb | 420 | 89.62 | 60.22 |
| 14 | VPO + Nb + Sb | 418 | 89.47 | 60.86 |
| 15 | VPO + Nb + Sb | 427 | 90.00 | 60.68 |
| 16 | VPO + Nb + Sb | 414 | 89.98 | 61.77 |
| 17 | VPO + Nb + Sb | 422 | 90.30 | 61.31 |
| 18 | VPO + Nb + Sb | 413 | 89.59 | 60.95 |
| C19 | VPO + Nb (added in prep) | 409 | 86.1 | 58.5 |
| 20 | VPO + Nb (added in prep) + Sb (by impregnation) | 423 | 89.55 | 60.03 |
| C21 | VPO + Nb + Ti | 415 | 87.15 | 56.27 |
| C22 | VPO + Nb + P + Mo | 411 | 88.86 | 57.99 |
| C23 | VPO + Nb + Fe | 410 | 88.79 | 57.80 |
| C24 | VPO + Nb + Co | 426 | 90.3 | 58.7 |
| C25 | VPO + Nb + Co | 417 | 89.2 | 57.44 |
| C26 | VPO + Nb + Zn | 443 | 88.37 | 56.15 |
| C27 | VPO + Nb + Cu | 434 | 88.6 | 50.65 |
| C28 | VPO + Nb + Cr | 404 | 88.91 | 51.38 |
| C29 | VPO + Nb + Rb | 429 | 84.68 | 47.82 |
| C30 | VPO + Nb + W | 418 | 89.03 | 53.17 |
| C31 | VPO + Nb + Eu | 434 | 89.86 | 53.17 |

Notes:
1. "RX Temp" is the reactor temperature in ° C.
2. "C4 Conv." is a percentage calculated as (moles of n-butane converted to products and by-product divided by the moles of n-butane fed) x 100.
3. "Maleic Anhydride Yield" is a percentage calculated as (moles of maleic anhydride produced divided by the moles of n-butane fed) x 100.

Niobium promoted VPO catalysts are known in the art. The data in Table 1 illustrates that an improved catalyst for converting butane and oxygen to maleic anhydride can be prepared by adding antimony or bismuth as an additional promoter to a niobium promoted VPO catalyst, as measured by butane conversion and maleic anhydride yield (compare Examples 4-18 and 20 to Examples C1-C3 and C19) The data in Table 1 also illustrates that this same effect (i.e. an improved catalyst as measured by butane conversion and maleic anhydride yield) is not obtained for other promoter metals when added to a niobium promoted VPO catalysts (compare Examples 4-18 and 20 to Examples C21-C31.).

While the foregoing description and the above embodiments are typical for the practice of the instant invention, it is evident that many alternatives, modifications, and variations will be apparent to those skilled in the art in light of this description. Accordingly, it is intended that all such alternatives, modifications and variations are embraced by and fall within the spirit and broad scope of the appended claims.

The claimed invention is:

1. A process for the preparation of a promoted VPO catalyst, wherein the catalyst comprises the mixed oxides of vanadium and phosphorus and wherein the catalyst is promoted with niobium and at least one of antimony and bismuth, said process comprising the steps of
   (i) preparing a VPO catalyst comprising vanadyl pyrophosphate as the major component and containing less than 5 wt % of vanadyl phosphate,
   (ii) impregnating the VPO catalyst with a metal source compound of niobium and a metal source compound of at least one of antimony and bismuth, to form a metal impregnated VPO catalyst, and
   (iii) drying the metal impregnated VPO catalyst to form the promoted VPO catalyst.

2. The process of claim 1, wherein the impregnation of the VPO catalyst in (ii) comprises contacting the VPO catalyst with a single liquid mixture comprising a metal source compound of niobium and a metal source compound of at least one of antimony and bismuth, to form a metal impregnated VPO catalyst wherein the liquid mixture comprises about 0.5% to about 10% by weight of niobium and about 0.5% to about 10% by weight of at least one of antimony and bismuth.

3. The process of claim 1, wherein the impregnation of the VPO catalyst in (ii) comprises contacting the VPO catalyst with a liquid mixture comprising a metal source compound of niobium and a liquid mixture comprising a metal source compound of at least one of antimony and bismuth, to form a metal impregnated VPO catalyst, wherein the liquid mixture comprising a metal source compound of niobium comprises about 0.5% to about 10% by weight of niobium and wherein the liquid mixture comprising a metal source compound of at least one of antimony and bismuth comprises about 0.5% to about 10% by weight of at least one of antimony and bismuth.

4. The process of claim 3, wherein the catalyst is dried after being contacted with an initial liquid mixture and prior to being contacted with a subsequent liquid mixture.

5. The process of claim 1, wherein the VPO catalyst comprises greater than 80 wt % vanadyl pyrophosphate and less than 5 wt % of vanadyl phosphate.

6. The process of claim 1, wherein the VPO catalyst comprises greater than 90 wt % vanadyl pyrophosphate and less than 3 wt % of vanadyl phosphate.

7. The process of claim 1, wherein the VPO catalyst has been formed into microsperoidal particles.

8. The process of claim 1, wherein the metal source compound of niobium comprises ammonium niobium oxalate.

9. The process of claim 1, wherein the metal source compound of at least one of antimony and bismuth is a metal source compound of antimony selected from the group consisting of antimony acetates and antimony oxides.

10. The process of claim 9, wherein the metal source compound of antimony is selected from the group consisting of $Sb(CH_3COO)_3$, $Sb_2O_5$, and $Sb_2O_3$.

11. The process of claim 9, wherein the metal source compound of antimony is nano-particle $Sb_2O_5$ with an average particle size of less than 10 nm.

12. The process of claim 1, wherein the metal source compound of at least one of antimony and bismuth is a metal source compound of bismuth selected from the group consisting of bismuth acetates, bismuth oxides, bismuth carboxides, and bismuth hydroxides.

13. The process of claim 1, wherein the metal impregnated VPO catalyst is dried at between 100° C. and 300° C. for 2 to 5 hours in an inert atmosphere.

14. The process of claim 1, wherein the metal impregnated VPO catalyst is dried at about 200° C. for about 3 hours in an inert atmosphere.

15. A process for the preparation of a promoted VPO catalyst, wherein the catalyst comprises the mixed oxides of vanadium and phosphorus and wherein the catalyst is promoted with niobium and at least one of antimony and bismuth, said process comprises impregnating a niobium promoted VPO catalyst with a metal source compound of at least one of antimony and bismuth, to form a metal impregnated VPO catalyst, and then drying the metal impregnated VPO catalyst to form the niobium and at least one of antimony and bismuth promoted VPO catalyst.

16. The process of claim 15, wherein the impregnation of the niobium promoted VPO catalyst comprises contacting the niobium promoted VPO catalyst with a liquid mixture comprising a metal source compound of at least one of antimony and bismuth, to form a metal impregnated VPO catalyst, wherein the liquid mixture comprising a metal source compound of at least one of antimony and bismuth comprises about 0.5% to about 10% by weight of at least one of antimony and bismuth.

17. The process of claim 15, wherein the niobium promoted VPO catalyst comprises greater than 80 wt % vanadyl pyrophosphate and less than 5 wt % of vanadyl phosphate.

18. The process of claim 15, wherein the niobium promoted VPO catalyst comprises greater than 90 wt % vanadyl pyrophosphate and less than 3 wt % of vanadyl phosphate.

19. The process of claim 15, wherein the niobium promoted VPO catalyst has been formed into microsperoidal particles.

20. The process of claim 15, wherein the metal source compound of at least one of antimony and bismuth is a metal source compound of antimony selected from the group consisting of antimony acetates and antimony oxides.

21. The process of claim 15, wherein the metal source compound of antimony is selected from the group consisting of $Sb(CH_3COO)_3$, $Sb_2O_5$, and $Sb_2O_3$.

22. The process of claim 21, wherein the metal source compound of antimony is nano-particle $Sb_2O_5$ with an average particle size of less than 10 nm.

23. The process of claim 15, wherein the metal source compound of at least one of antimony and bismuth is a metal source compound of bismuth selected from the group consisting of bismuth acetates, bismuth oxides, bismuth carboxides, and bismuth hydroxides.

24. The process of claim 15, wherein the metal impregnated VPO catalyst is dried at between 100° C. and 300° C. for 2 to 5 hours in an inert atmosphere.

25. The process of claim 15, wherein the metal impregnated VPO catalyst is dried at about 200° C. for about 3 hours in an inert atmosphere.

\* \* \* \* \*